(12) United States Patent
Sato et al.

(10) Patent No.: US 6,368,537 B1
(45) Date of Patent: Apr. 9, 2002

(54) LAMINATED PLATE AND METHOD FOR MAKING THE SAME

(75) Inventors: Kan-ichi Sato; Masayuki Oishi, both of Osaka; Satoshi Fujimoto; Makoto Nogawa, both of Kanagawa; Tamio Furuya, Saitama, all of (JP)

(73) Assignees: Komatsu Ltd., Tokyo; Honda Engineering Co., Ltd., Saitama; Honda Motor Co., Ltd., Tokyo, all of (JP)

(*) Notice: Subject to any disclaimer, the term of this patent is extended or adjusted under 35 U.S.C. 154(b) by 0 days.

(21) Appl. No.: 08/817,164

(22) PCT Filed: Oct. 20, 1995

(86) PCT No.: PCT/JP95/02164

§ 371 Date: Apr. 18, 1997

§ 102(e) Date: Apr. 18, 1997

(87) PCT Pub. No.: WO96/12604

PCT Pub. Date: May 2, 1996

(30) Foreign Application Priority Data

Oct. 20, 1994 (JP) ............................................... 6-255633

(51) Int. Cl.[7] ..................... B32B 31/04; B32B 31/06; B32B 31/12; B32B 31/20
(52) U.S. Cl. .................... 264/259; 264/1.7; 264/261; 264/265; 156/99; 156/102; 156/104; 156/106; 428/412
(58) Field of Search .................. 428/442, 430, 428/437, 412; 156/102, 104, 106, 99; 264/1.7, 261, 259, 265; 296/84.1

(56) References Cited

U.S. PATENT DOCUMENTS

| | | | |
|---|---|---|---|
| 3,666,614 A | * 5/1972 | Snedeker et al. | 428/412 |
| 4,169,181 A | 9/1979 | Molari, Jr. | 428/217 |
| 4,812,359 A | 3/1989 | Hall | 428/332 |
| 4,817,347 A | 4/1989 | Hand et al. | 52/171.3 |
| 4,957,663 A | 9/1990 | Zwiers et al. | 264/1.4 |
| 5,103,336 A | 4/1992 | Sieloff | 359/253 |
| 5,322,660 A | * 6/1994 | Hickman | 264/261 |
| 5,593,786 A | * 1/1997 | Parker et al. | 428/426 |
| 5,667,897 A | * 9/1997 | Hashemi et al. | 428/426 |

FOREIGN PATENT DOCUMENTS

| | | |
|---|---|---|
| JP | 61022915 A | 1/1986 |
| JP | 62260845 A | 11/1987 |
| JP | 02227224 A | 9/1990 |
| JP | 04052113 A | 2/1992 |
| JP | 10058531 | 3/1998 |

* cited by examiner

Primary Examiner—Paul Thibodeau
Assistant Examiner—Ramsey Zacharia
(74) Attorney, Agent, or Firm—Armstrong, Westerman, Hattori, McLeland & Naughton, LLP

(57) ABSTRACT

A laminated plate comprising a glass layer located in front and formed from a glass sheet and a resin layer located at the back of the glass layer and molded from a molten thermoplastic material spread at a low pressure over the glass layer, the glass layer and the resin layer being arranged in a laminated fashion. A method for producing the laminated plate wherein the glass sheet is first provided so as to be in close contact with the inner side of at least either one of dies used in a compression molding machine and then the dies are clamped for compression molding, with the molten resinous material to be supplied to a mold cavity being spread at a low pressure over the glass sheet, whereby the laminated plate comprising, in a laminated fashion, the glass layer composed of the glass sheet and the resin layer molded by spreading the molten resinous material at a low pressure can be formed.

14 Claims, 5 Drawing Sheets

LAMINATED PLATE AND METHOD FOR MAKING THE SAME

TECHNICAL FIELD

The present invention relates to a laminated plate well adapted for use, for example, wind shield of a vehicle, which comprises a transparent glass layer located in outer side and a transparent resin layer located at the inner side of the glass layer in a laminated fashion.

BACKGROUND ART

There have been conventionally proposed laminated plates designed to include glass layers for the purpose of enhancing weight reduction and providing reinforcement. One of such known laminated plates includes a glass sheet laminated to the front face of a pre-molded or extruded resin sheet. Another composite body includes two glass sheets which are respectively laminated to both of the front and rear surfaces of a resin sheet so as to sandwich the resin sheet.

Such composite bodies have, however, the disadvantage that as the glass sheet is bonded to the pre-molded or extruded resin sheet, a gap would be created between the resin sheet and the glass sheet resulting in bonding defects if the surface of the resin sheet is not flat because of warp and shrinkage.

In addition, the pre-molded or extruded resin sheet should be treated with the greatest possible care not to hurt its surface, prior to bonding the glass sheet to the resin sheet.

The invention has been made to overcome the above problems and the prime object of the invention is therefore to provide a laminated plate and its producing method, the composite body comprising at least one glass layer that is located in front in order to reinforce the surface of the composite body, whereas the composite body is free from bonding defects and able to be easily produced without taking great care not to hurt the surface of the resin sheet.

The second object of the invention is to provide a laminated plate and its producing method, the composite body being strengthened in its bonding quality between the glass layer and the resin layer.

The third object of the invention is to provide a composite body and its producing method, the composite body being transparent and unnoticeable in respect of optical distortion or stress birefrin-gence.

DISCLOSURE OF THE INVENTION

The first object can be accomplished by a laminated plate according to the invention, comprising:

(a) a glass layer located in front and formed from a glass sheet; and
(b) a resin layer located at the back of the glass layer and molded by applying a low pressure by die clamping to a molten resinous material so as to be spread over the glass layer,
  the glass layer and the resin layer being arranged in a laminated fashion. Alternative laminated plate may comprise:
(a) a first glass layer located in front and formed from a glass sheet;
(b) a second glass layer located behind and in parallel with the first glass layer and formed from a glass sheet; and
(c) a resin layer molded by applying a low pressure by die clamping to a molten resinous material placed between the first and second glass layers so as to be spread over these glass layers,
  the first glass layer, the resin layer and the second glass layer being arranged in this order in a laminated fashion.

According to the invention, since the resin layer is molded by applying a low pressure by die clamping to the molten resinous material (in other words, by applying a low pressure to the overall molten resinous material) so as to be spread over the glass layer formed from a glass sheet, the bonding defects do not occur between the glass layer and the resin layer although the composite body is provided with the glass layer at least at the front face thereof for the purpose of providing reinforcement to the surface of the composite body. In addition, there is no need to treat the composite body with the greatest care not to hurt the surface of the resin sheet unlike the prior art.

The second object can be achieved by a laminated plate according to the invention, wherein "surface irregularities treatment" is applied to make the joint surface of the glass sheet of the glass layer rugged, the joint surface joining to the resin layer, and wherein an intermediate layer is formed between the joint surfaces of the glass layer and the resin layer, the intermediate layer being formed from, for example, a thermoplastic elastomer which is adhesive to the glass sheet and to the molding and molten elastomer can relax the thermal stress caused by difference of heat expansion between the glass sheet and the molding, molten resinous material during molding of the resin layer.

In this way, the bonding strength between the glass layer and the resin layer is enhanced. The intermediate layer may be formed by primer coating in which the above elastomer is applied to the joint surface of the glass sheet joining to the resin layer or alternatively formed by affixing a resin film formed from the above resin material to the joint surface.

The third object can be accomplished by a laminated plate according to the invention, wherein the glass sheet is transparent and the molten resinous material is selected from the group consisting of polycarbonate, acrylic resin, polystyrene, amorphous polyolefin, and polyethylene terephthalate, and wherein the above low pressure is not more than 150 Kg/cm$^2$.

In the composite body including the intermediate layer, the thermoplastic resinous material from which the intermediate layer is made may be selected from the group consisting of ethylene-vinyl acetate copolymer, thermoplastic polyurethane, ethylene-acrylate-maleic anhydride ternary copolymer, hydrogenated SBR (SBR hydride) and polyvinyl butyral, these materials exerting transparency after molding of the resin layer.

It should be noted that the thinner the glass sheet, the lighter the weight of the laminated plate.

To achieve the first object, a method for producing a laminated plate according to the invention is characterized in that: a glass sheet is first provided so as to come in close contact with the inner side of at least either one of dies for use in a compression molding machine and a molten resinous material to be supplied to a mold cavity being spread at a low pressure over the glass sheet, then the compression molding is carried out by clamping both dies to apply a low pressure to a molten resinous material to be supplied to a mold cavity such that the molten resinous material is spread over the glass sheet, whereby the laminated plate comprising, in a laminated fashion, a glass layer composed of the glass sheet and a resin layer molded from the molten resinous material that is spread by applying a low pressure thereto by die clamping can be formed.

To achieve the second object, the producing method may include primer coating in which a resinous material is applied before-hand to the joint surface of the glass sheet or pre-affixing of a resin film formed from the resinous material to the joint surface, the joint surface being joined to the resin layer to be molded from the molten resinous material, the resinous material being adhesive to the glass sheet and to the molding, molten resinous material and having the function of relaxing the thermal stress caused by differences of heat expansion between the glass sheet and the molten resinous material during the molding of the resin layer from the molten resinous material.

In order to provide transparency to the resultant, laminated plate and make its distortion unnoticeable or stress birefringence, the glass sheet should be transparent and the molten resinous material should be selected from the group consisting of polycarbonate, acrylic resin, polystyrene, amorphous polyolefin and polyethylene terephthalate, and the above low pressure should be no more than 150 Kg/cm$^2$. The resinous material used in primer coating or constituting the resin film is selected from the group of thermoplastic resinous materials consisting of ethylene-vinyl acetate copolymer, thermoplastic polyurethane, ethylene-acrylate-maleic anhydride ternary copolymer, hydrogenated SBR (SBR hydride) and polyvinyl butyral. These materials exert transparency after molding of the resin layer.

Other objects of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will be best understood from the following detailed description when taken in conjunction with the accompanying drawings which discloses certain embodiments of the invention but is not limitative of the scope of the invention.

BEST MODE FOR CARRYING OUT THE INVENTION

Reference is now made to the accompanying drawings to describe laminated plates and their producing methods according to preferred embodiments of the invention in which an injection compression molding machine is used.

Figure 1:
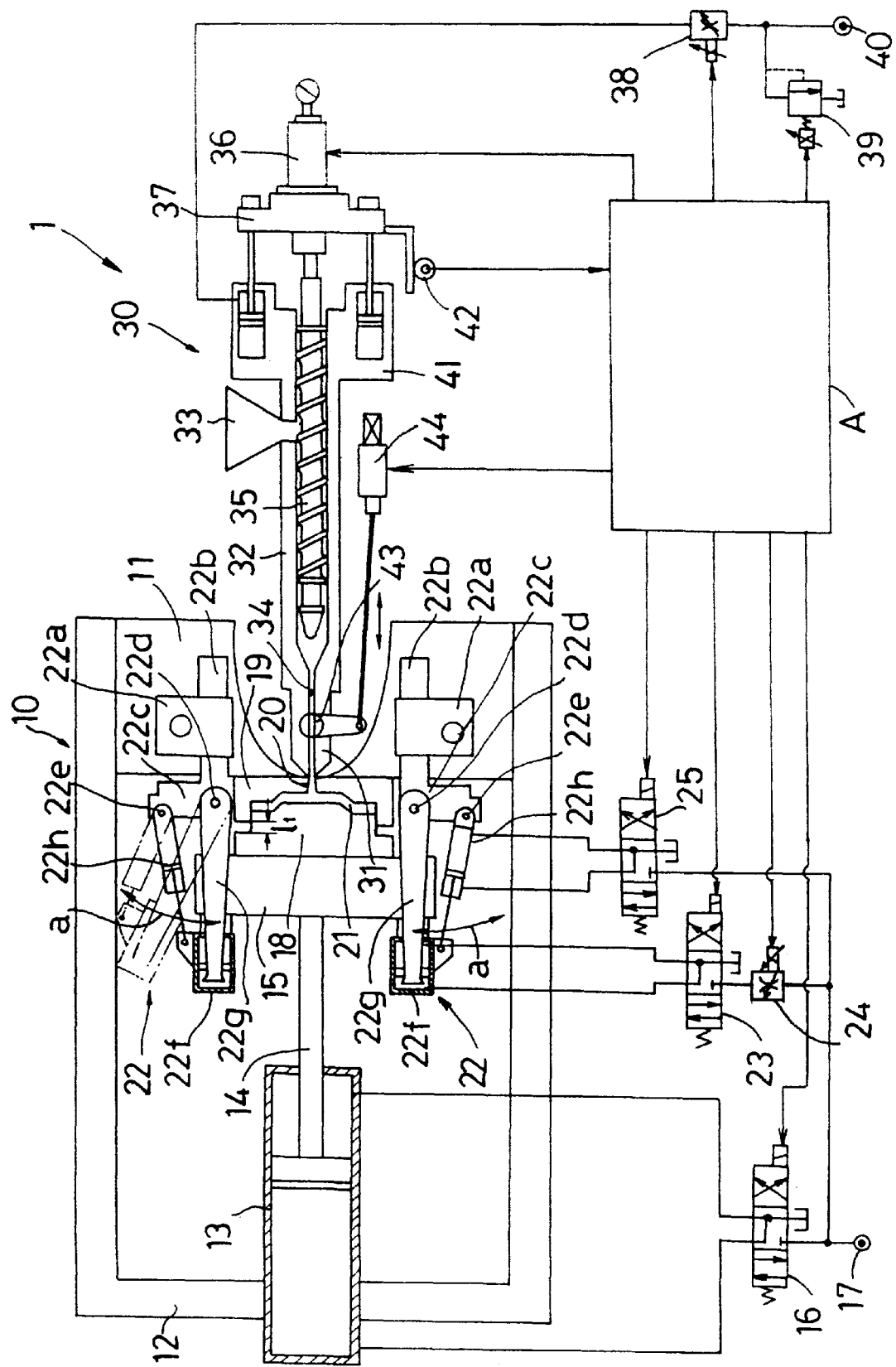
FIG. 1 illustrates, in schematic form, the entire structure of an injection compression molding machine used in the description of a laminated plate and its method according to the invention.

In FIG. 1 showing the entire schematic view of an injection compression molding machine, the injection compression molding machine 1 is made up of a compression molding unit 10, an injection unit 30 and a controller A for controlling the compression molding unit 10 and the injection unit 30. The compression molding unit 10 includes a die opening/closing cylinder 13 located on the left side of a frame 12 so as to extend to the left, the frame 12 being fixed to a table 11. A movable die plate 15 disposed within the frame 12 is engaged with a piston rod 14 provided for the die opening/closing cylinder 13. This movable die plate 15 is moved to the left or right by controlling pressure oil that is supplied from a pressure oil source 17 to the die opening/closing cylinder 13 or discharged reversely, the pressure oil control being performed through the energization/deenergization control of a solenoid selector valve 16 by the controller A. Attached to the right side of the movable die plate 15 is a movable die 18. In opposed relation with this movable die 18, a fixed die 19 is attached to the left side of the table 11. The fixed die 19 is provided with an inlet 20 pierced therein through which a molten resinous material is fed to a mold cavity 21 formed between the dies 18 and 19.

The compression molding unit 10 includes a die clamping apparatus 22 which locks the movable die plate 15 when the movable die 18 attached to the movable die plate 15 is separated from the fixed die 19 with a predetermined spacing $l_1$ after the movable die plate 15 has been driven to the right by the die opening/closing cylinder 13 and which allows the movable die plate 15 to further move to the right thereby clamping both of the dies 18 and 19. The die clamping apparatus 22 is composed of a pair of following mechanisms which are respectively disposed above and below the movable die plate 15.

One mechanism comprises (i) a height adjuster 22a secured to the table 11, (ii) a cylinder frame 22c which is adjusted so as to move to the left or right, according to the thickness of the dies 18, 19 and to the predetermined spacing $l_1$, by means of the height adjuster 22a through a rod 22b, and (iii) a link 22g and a lock cylinder 22h which are supported to the cylinder frame 22c with pins 22d, 22e respectively so as to freely pivot in the direction of arrow a, the link 22g having a die clamping cylinder 22f at the leading end thereof while the lock cylinder 22h allows the link 22g to pivot in the direction of arrow a so as to be away from or come close to the movable die plate 15. It should be noted that the die clamping cylinder 22f and the lock cylinder 22h are similarly operated by controlling pressure oil of the pressure oil source 17 supplied to or discharged from the cylinders 22f, 22h through the energization/deenergization control of solenoid selector valves 23, 25 and the flow rate control of a flow control valve 24 performed by the controller A, so that the movable die plate 15 moves right-ward together with the movable die 18 and the link 22g moves in the direction of arrow a.

In the injection unit 30, a nozzle section 31 is joined to the inlet 20 of the fixed die 19 in the compression molding unit 10, and a screw 35 is housed in a cylinder 32. In the heated cylinder 32, while a resinous material (such as a plastic synthetic resin) fed from a material hopper 33 in the form of pellet or powder being melted and mixed by the screw 35, the resinous material is metered and then injected into the mold cavity 21 via a extension nozzle 34 and the gate 20 of the fixed die 19 by means of the screw 35. The rotation of the screw 35 for melting and mixing of the resinous material is carried out by a screw rotating motor 36. The screw 35 and the screw rotating motor 36 are mounted to a base plate 37. The base plate 37 is moved to the left or right by controlling pressure oil which is supplied from a pressure oil source 40 to a hydraulic piston 41 or discharged reversely, the pressure oil control being carried out through the flow rate control of a flow control valve 38 and the pressure value setting control of a solenoid relief valve 39 performed by the controller A. In other words, the forward/backward movement of the screw 35 relative to the nozzle section 31 for weighing of the molten resinous material to be injected and for injection of the weighed molten resinous material into the mold cavity 21 and the application of a predetermined pressing force to the screw 35 in order to apply a predetermined injection pressure to the molten resinous material within the cylinder 32 are carried out by supplying pressure oil to the hydraulic piston 41 or discharging it therefrom through the base plate 37.

The controller A is provided with a screw positional value that is measured by a screw position detector 42 engaged with the base plate 37. Based on the comparison between this measured screw positional value and a preset stroke value, the controller A performs control in conjunction with the forward/backward movement of the screw 35 etc. according to a specified program so that the solenoid selector valves 16, 23, 25, the flow control valves 24, 38, and the solenoid relief valve 39 are operated and so that the rotation/stop of the screw rotating motor 36 and the switching of an opening/closing rotary valve 43 incorporated in the extension nozzle 34 of the nozzle section 31 by means of a servo motor 44 are controlled.

FIG. 1 shows one of the injection compression machine, but not only this machine but other injection compression mechanism which has same concept may be applicable for this invention.

With reference to FIGS. 2(a) to 2(e) and FIG. 3, there will be explained the steps of the method of producing the laminated plate by use of the injection compression molding machine 1 of the above-described structure according to the invention. It should be noted that Stages I to VII in FIG. 3 correspond to the steps (I) to (VII) in the following description respectively.

(I) Installation Step

In this embodiment, when the movable die 18 is in a position separated from the fixed die 19 with a spacing exceeding the predetermined spacing value $l_1$, a glass sheet 50 having a thickness of 0.1 mm and a specified shape is installed so as to be in close contact with the inner side of the movable die 18. A resin film 51 made from a resinous material (described later) is affixed beforehand to the surface of the glass sheet 50, which surface is opposite to the surface contacting the movable die 18.

(II) Die Closing Step

Until the spacing between the movable die 18 having the glass sheet 50 installed at the inner side thereof and the fixed die becomes equal to the predetermined spacing value $l_1$, the energization/deenergization control of the solenoid selector valve 16 is performed so that the movable die plate 15 is moved to the right by the die opening/closing cylinder 13 to move the movable die 18 forward.

Figure 2A:
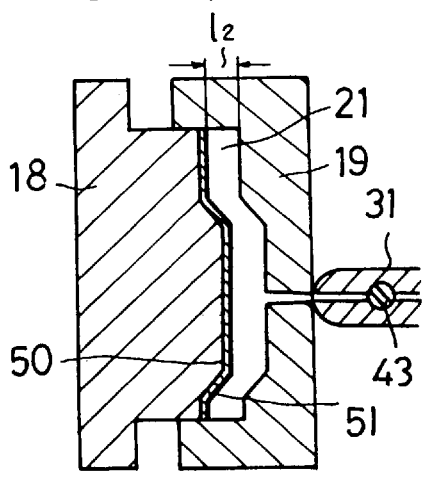
FIGS. 2(a) to 2(e) illustrate, in schematic form, steps for producing the laminated plate of the invention by use of the injection compression molding machine shown in FIG. 1.

(III) Movable Die Locking Step (FIG. 2(a))

When the movable die 18 is in a position separated from the fixed die 19 with the predetermined spacing $l_1$, the energization/deenergization control of the solenoid selector valve 25 is performed to allow the lock cylinder 22h to pivot the link 22g toward the movable die plate 15. Then, the energization/deenergization control of the solenoid selector valve 23 and the flow rate control of the flow control valve 24 are performed to drive the die clamping cylinder 22f such that the right end of the die clamping cylinder 22f comes in contact with the left surface of the movable die plate 15, whereby the movable die plate 15 and therefore the movable die 18 are locked. Sequentially, the movable die plate 15 is moved to the right by the die clamping cylinder 22f, thereby moving the movable die 18 forward until the movable die 18 is in a position separated from the fixed die 19 with a spacing equal to a compression width $l_1$.

Figure 2B:
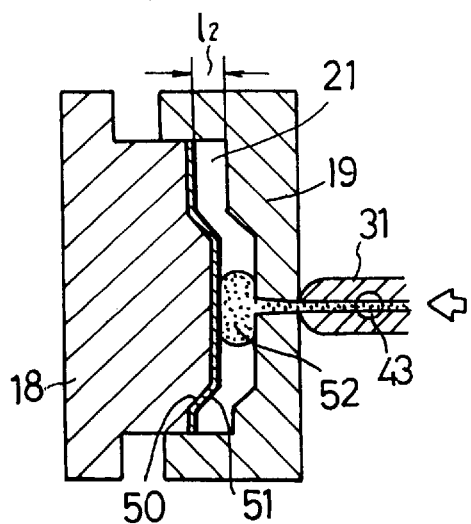

(IV) Injection Feeding Step (FIG. 2(b))

When the movable die 18 is away from the fixed die 18 with a spacing equal to the compression width 12, the servo motor 44 is driven to open the opening/closing rotary valve 43 in the nozzle section 31 of the injection unit 30. In the mean time, the flow rate control of the flow control valve 38 and the pressure value setting control of the solenoid relief valve 39 are performed, thereby moving the screw 35 forward with the help of the hydraulic piston 41 to inject a molten resinous material 52 at a low pressure into the mold cavity 21 via the extension nozzle 34 and the inlet 20.

Additionally the rotary valve 43 previously controls the injection rate and injection volume of a molten resinous material 52.

Figure 2C:
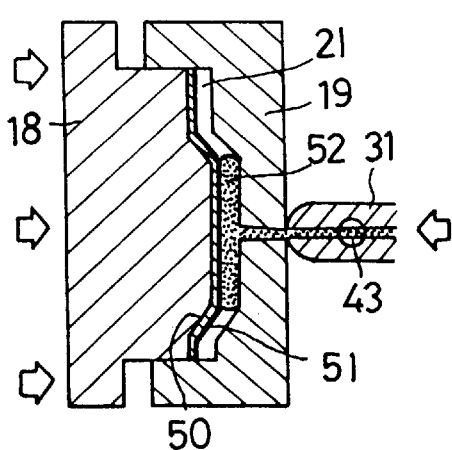

(V) Mold Cavity Compression Step (FIG. 2(c))

While the molten resinous material 52 being injected at a low pressure into the mold cavity 21, the movable die 18 is moved simultaneously forward to the fixed die 19 by a distance equal to the compression width 12 by means of the die clamping cylinder 22f so that the volume of the mold cavity 21 is reduced. The molten resinous material 52 being injected is spread over the glass sheet 50 under a low pressure of 100 kg/cm$^2$ such that the material 52 forms a 3 mm-thick layer in this embodiment. When the resinous material 52 in its molten state has been fed to the mold cavity 21 in an amount necessary for molding, the servo motor 44 is driven to close the opening/closing rotary valve 43.

After that the rotary valve 43 acts as a shut off valve to prevent back-flow of a molten material during compression.

Figure 2D:
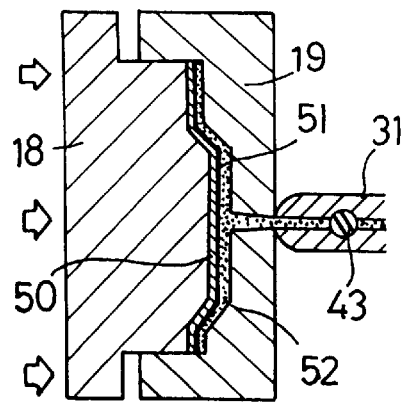

(VI) Cooling Step (FIG. 2(d))

While the volume of the mold cavity 21 being reduced by moving the movable die 18 forward to the fixed die 19 by a distance equal to the compression width 12, the molten resinous material 52 being spread is continuously held and compressed under a holding pressure caused by the die clamping cylinder 22f until the molten resinous material 52 is cooled and bonded to the glass sheet 50 by virtue of the fusion of the resin film 51.

Figure 2E:
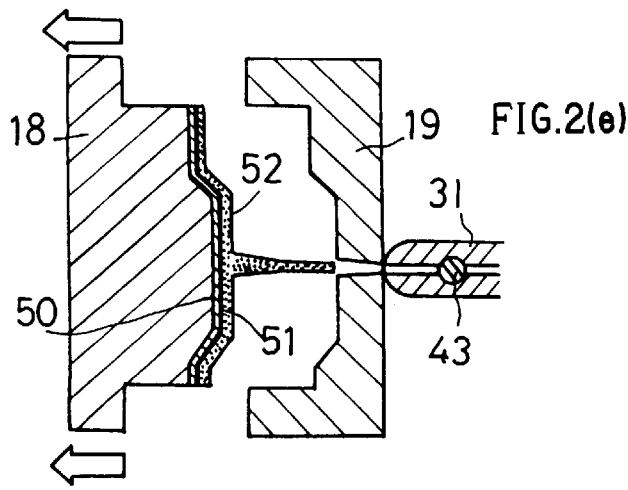
Figure 3:
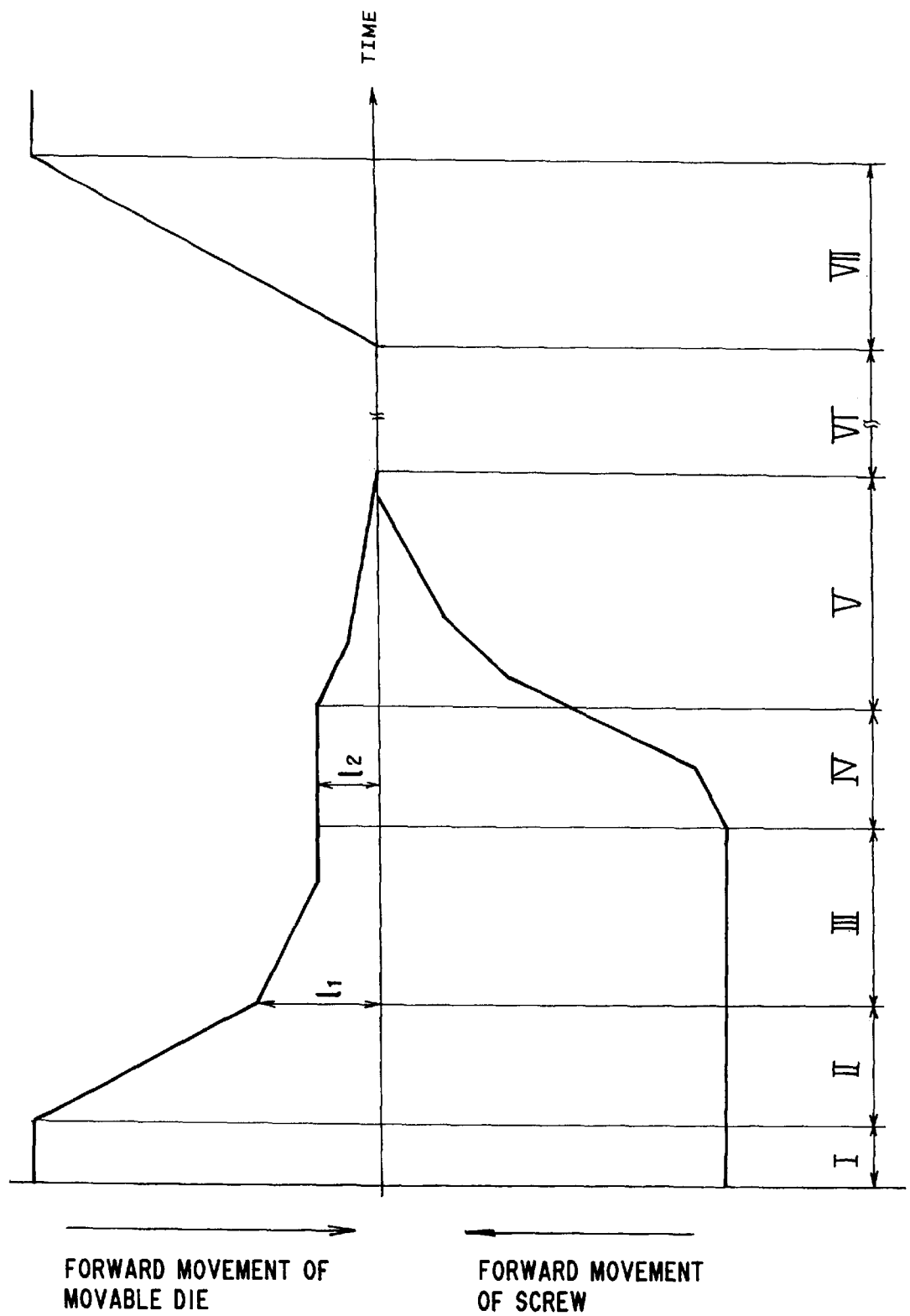
FIG. 3 is a sequence chart showing the movement of movable die plate and the movement of a screw during the production of the laminated plate of the invention, the dies and screw being controlled simultaneously in the injection compression molding machine shown in FIG. 1.

(VII) Die Opening Step (FIG. 2(e))

Figure 4:
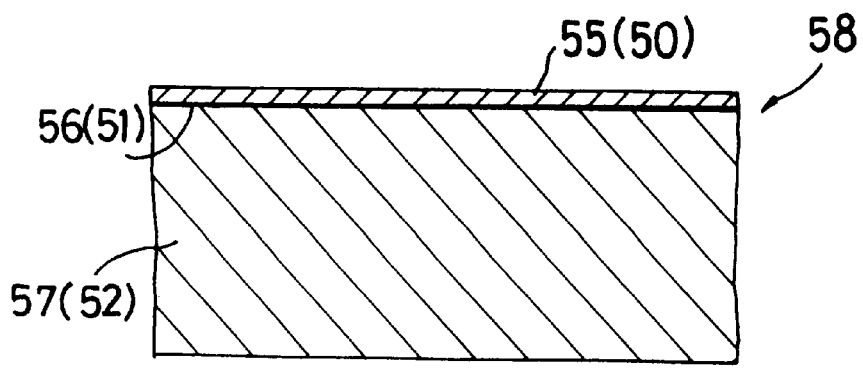
FIG. 4 is a cross section view of the laminated plate produced through the steps shown in FIG. 2.

After cooling of the molten resinous material 52, the energization/deenergization control of the solenoid selector valve 23 is performed thereby driving the die clamping cylinder 22f to release the movable die 18 and therefore the movable die plate 15 from the locked condition. Further, the energization/deenergization control of the solenoid selector valve 25 is performed thereby driving the lock cylinder 22h to allow the link 22g to pivot, departing from the movable die plate 15. Sequentially, the energization/deenergization control of the solenoid selector valve 16 is performed thereby moving the movable die plate 15 to the left with the help of the die opening/closing cylinder 13 to move the movable die 18 backward. In this way, a laminated plate 58, in which a glass layer 55 formed from the glass sheet 50, an intermediate layer 56 formed from the resin film 51 and a resin layer 57 formed from the molten resinous material 52 are laminated in this order as shown in FIG. 4, is taken out of the dies 18, 19.

Although the glass sheet 50 has a thickness of 0.1 mm in this embodiment, the preferable thickness of the glass sheet 50 may be within the range of from 0.1 to 3 mm. Although the resin layer 57 has a thickness of 3 mm in this embodiment, the preferable thickness of the resin layer 57 ranges from 3 mm to 6 mm.

The resinous material of the resin film 51 should be selected from materials which are adhesive to the glass sheet 50 and to the molding, molten resinous material 52 and which can relax the differences in abrasion and in heat expansion between the glass sheet 50 and the molding, molten resinous material 52 during molding of the resin layer 57. By use of an appropriate material, the bonding strength between the glass layer 55 and the resin layer 57 can be enhanced. In the case where the sheet-like composite body 58 having transparency is produced, not only the glass sheet 50 but also the resinous material of the resin film 51 should be transparent. Specifically, where polycarbonate, acrylic resin, polystyrene, amorphous polyolefin or polyethylene terephthalate is used as the molten resinous material 52 having transparency, the resinous material of the resin film 51 should exert at least a light transmittance of 70% or more after molding of the resin layer 57 made from polycarbonate etc. and should have substantially the same refractive index as the resin layer 57 as well as the above-mentioned relaxing ability for abrasion and heat expansion differences. In addition, adhesiveness to glass is required. In view of the above characteristics, the resinous material of the resin film 51 is preferably selected from thermoplastic resinous materials having —OH groups, —COOH groups, —COOH$_2$ groups or the like, examples of which include ethylene-vinyl acetate copolymer, thermoplastic polyurethane, ethylene-acrylate-maleic anhydride ternary copolymer, hydrogenated SBR (SBR hydride) and polyvinyl butyral. It should be noted that when polycarbonate is used as the molten resinous material 52, polyvinyl butyral is not preferred. In the case where the laminated plate 58, which is transparent and whose distortion is unnoticeable, is produced, the applied pressure in molding with the molten resinous material 52 spread over the glass sheet 50 should not exceed 150 kg/cm$^2$ in order not to cause stress strain in the molten resinous material 52 and should fall within such a range that allows the molten resinous material 52 to spread over the glass sheet 50.

In the following descriptions, the prime or primes used for various reference numbers represent the same respective parts or elements, but of different embodiments.

Figure 5:
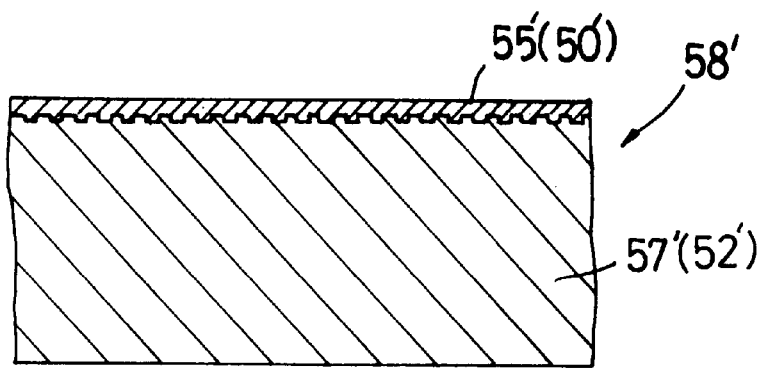
FIG. 5 is a cross section view of a laminated plate according to another embodiment, which does not include an intermediate layer and in which the surface irregularities treatment is applied to the joint surface of a glass sheet.

While the intermediate layer 56 is formed by affixing the resin film 51 made from the above-described resinous material in this embodiment, the intermediate layer 56 may be formed by primer coating in which such a resinous material is preliminarily applied to the joint surface of the glass sheet 50. In an alternative laminated plate 58' as shown in FIG. 5, the intermediate layer is not used but the surface irregularities treatment is applied to the joint surface of a glass sheet 50' that constitutes a glass layer 55' in order to improve bonding quality.

It should be noted that in the case where the above-described intermediate layer 56 is formed, it is possible to apply printing treatment to the joint surface of the glass sheet 50 to which the above resin film 51 is affixed or primer coating is applied. Also, mirror finishing may be applied to the joint surface of the glass sheet 50 joining to the intermediate layer 56, or a transparent conductive film such as an indium-tin oxide film may be formed on the joint surface by spattering.

Figure 7:
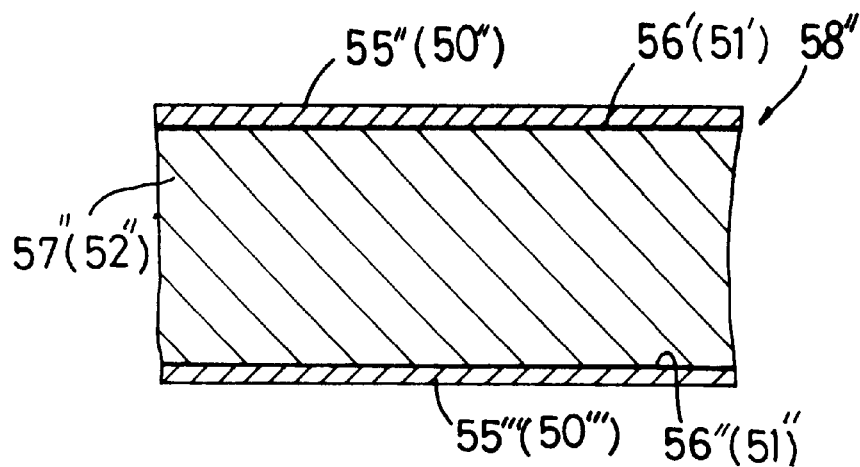
FIG. 7 is a cross section view of the laminated plate produced through the process shown in FIG. 6.
Figure 6:
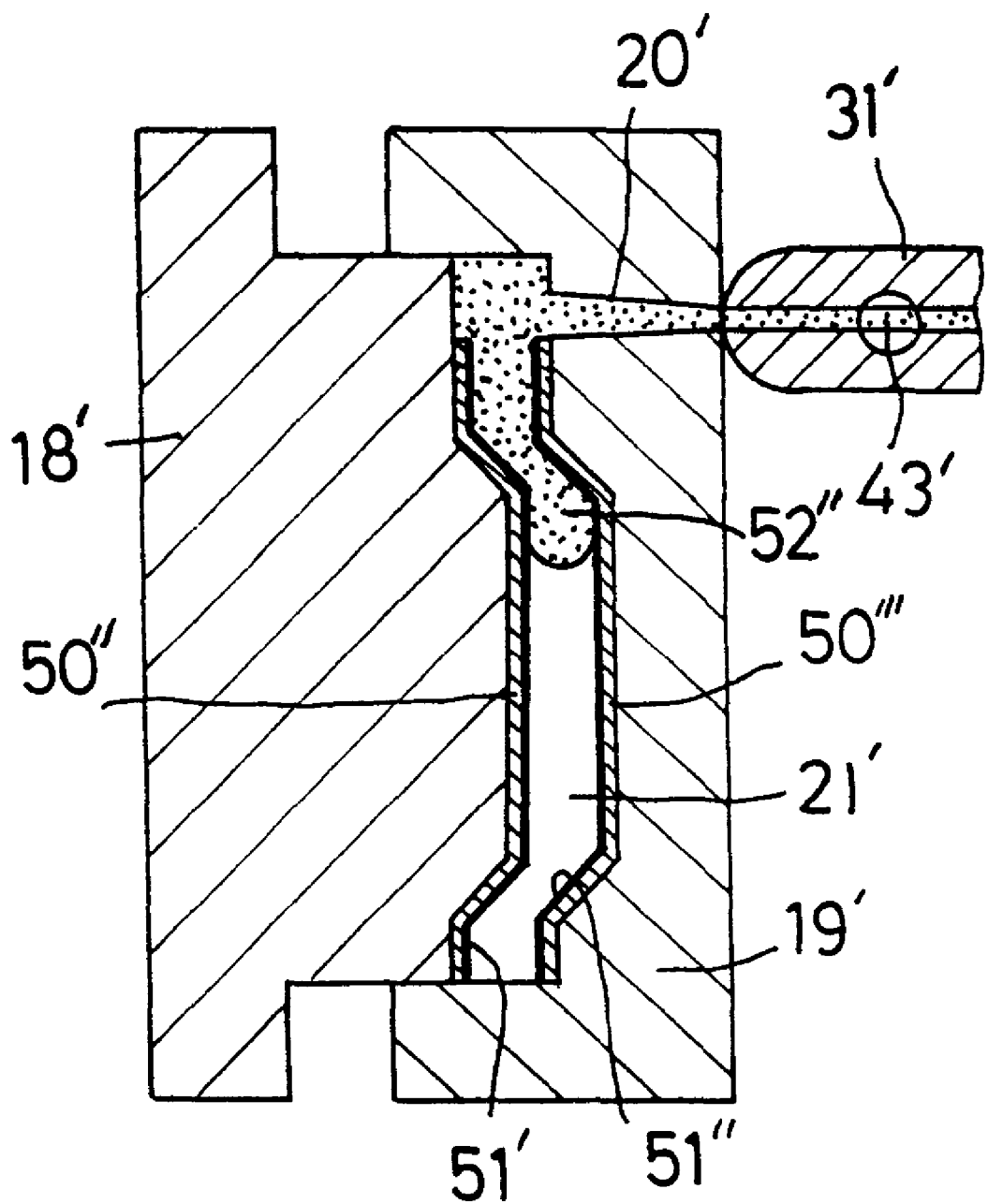
FIG. 6 is a schematic diagram corresponding FIG. 2(b), which illustrates a process for producing a laminated plate having a glass layer on both surfaces according to still another embodiment of the invention.

While the glass layer 55 is formed on one surface of the laminated plate 58 in this embodiment, a laminated plate 58" having glass layers 55", 55"' on both surfaces thereof as shown in FIG. 7 may be produced. In this case, as shown in FIG. 6, a gate 20' through which a molten resinous material 52" is injected into a mold cavity 21' is arranged aside, so that thin glass sheets 50", 50"' of a specified shape can be respectively overlaid on the respective inner sides of a movable die 18' and a fixed die 19' in a close contact manner. Reference numerals 56' and 56" in FIG. 7 respectively represent an intermediate layer. As a matter of course, the above-described surface irregularities treatment may be employed instead of forming intermediate layers 56', 56".

An impact test was conducted using the laminated plate 58 in which a 0.1 mm-thick glass layer 55, a 0.4 mm-thick intermediate layer 56 of the resin film 51 made from an ethylene-vinyl acetate copolymer (resinous material) and a 6 mm-thick resin layer 57 formed from a polycarbonate were laminated. From 1 m above the laminated plate 58, a steel ball of 225g in weight was naturally dropped onto this laminated plate 58 with the glass layer 55 facing up. As a result, no cracks were found in the glass layer 55.

The compression molding unit such as disclosed in Japanese Patent Laid-Open Publications Nos. 5-220749 and 5-285955 may be used in place of the compression molding unit 10 of this embodiment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for producing a laminated plate, comprising applying a resin film composed of a resinous material to a joint surface of a glass sheet, contacting the glass sheet with the inner side of one of two dies used in a compression molding machine, and then while supplying by injection a molten thermoplastic material to a mold cavity, simultaneously molding by compression such that both dies apply a pressure that is not more than 150 Kg/cm$^2$ to the molten thermoplastic material, whereby the molten thermoplastic material is spread over the resin film applied on the joint surface of the glass sheet and said resin layer is bonded to the joint surface of said glass layer via said resin film, and wherein said molten thermoplastic material is polycarbonate, and said resin film and said resin layer have the same refractive index.

2. A method for producing a laminated plate according to claim 1, wherein the resin film is formed by applying a primer coating of a resinous material beforehand to the joint surface of said glass sheet or by affixing a resin film formed from said resinous material beforehand to said joint surface, said resinous material being adhesive to the glass sheet and to the molten thermoplastic material used in molding and having the function of relaxing the stress caused by differences in heat expansion and shrinkage between the glass sheet and the molded thermoplastic material during the molding of the resin layer from the molten thermoplastic material.

3. A method for producing a laminated plate according to claim 2, wherein the joint surface of the glass sheet to which the primer coating is applied or the resin film is affixed undergoes printing treatment.

4. A method for producing a laminated plate according to claim 1, wherein the joint surface of said glass sheet of said glass layer which joins to said resin layer undergoes surface irregularities treatment to get rugged.

5. A method for producing a laminated plate according to claim 1, wherein said glass sheet is transparent.

6. A method for producing a laminated plate according to claim 5, wherein said glass sheet has a thickness within a range of 0.1 to 3 mm.

7. A method for producing a laminated plate according to claim 1, wherein said resinous material of said resin film has a light transmittance of at least 70%.

8. A method for producing a laminated plate, comprising applying a resin film composed of a resinous material to each joint surface of two glass sheet, contacting the glass sheets with the respective inner sides of two dies used in a compression molding machine, and then while supplying by injection a molten thermoplastic material to a mold cavity, simultaneously molding by compression such that both dies apply a pressure that is not more than 150 Kg/cm$^2$ to the molten thermoplastic material, whereby the molten thermoplastic material is spread over the resin films applied on the joint surfaces of the glass sheets and said resin layer is bonded to the joint surfaces of said glass layers via said resin films, and wherein said molten thermoplastic material is polycarbonate, and said resin films and said resin layer have the same refractive index.

9. A method for producing a laminated plate according to claim 8, wherein the resin films are formed by applying a primer coating of a resinous material beforehand to the joint surface of each said glass sheet or by affixing a resin film formed from said resinous material beforehand to said joint surface of each glass sheet, said resinous material being adhesive to the glass sheets and to the molten thermoplastic material used in molding and having the function of relaxing the stress caused by differences in heat expansion and shrinkage between the glass sheet and the molded thermoplastic material during the molding of the resin layer from the molten thermoplastic material.

10. A method for producing a laminated plate according to claim 9, wherein said resinous material of said resin film has a light transmittance of at least 70%.

11. A method for producing a laminated plate according to claim 9, wherein the joint surface of each said glass sheet to which said primer coating is applied or said resin film is affixed undergoes printing treatment.

12. A method for producing a laminated plate according to claim 8, wherein the joint surface of said glass sheet of said first glass layer joining to said resin layer and the joint surface of said glass sheet of said second glass layer joining to said resin layer undergo surface irregularities treatment to get rugged.

13. A method for producing a laminated plate according to claim 8, wherein the respective glass sheets of said first and second glass layers are transparent.

14. A method for producing a laminated plate according to claim 13, wherein said glass sheets have thickness within a range of 0.1 to 3 mm.

* * * * *